United States Patent [19]

Simmons et al.

[11] Patent Number: 4,739,580

[45] Date of Patent: * Apr. 26, 1988

[54] PORTABLE TABLE WITH FRICTIONALLY ENGAGABLE LEG LOCKING MECHANISM

[76] Inventors: Jesse K. Simmons; Maralyne J. Simmons, both of 4030 Sleeth Rd., Milford, Mich. 48042

[*] Notice: The portion of the term of this patent subsequent to Mar. 11, 2003 has been disclaimed.

[21] Appl. No.: 808,101

[22] Filed: Dec. 12, 1985

Related U.S. Application Data

[62] Division of Ser. No. 718,158, Apr. 1, 1985, Pat. No. 4,574,594.

[51] Int. Cl.$^4$ .................. A01G 9/00; A47B 35/00; A47G 23/04
[52] U.S. Cl. .................................. 47/17; 47/29; 108/50; 126/261
[58] Field of Search ............... 47/17, 28, 29, 83; 126/43, 45, 47, 49, 261; 62/457, 371, 372, 530, 459, 462; 248/439; 108/50

[56] References Cited

U.S. PATENT DOCUMENTS

| | | | |
|---|---|---|---|
| 1,800,863 | 4/1931 | Johnson | 126/261 |
| 4,123,873 | 11/1978 | Canova | 47/83 |
| 4,141,798 | 2/1979 | Grosse | 47/17 |
| 4,569,150 | 2/1986 | Carlson et al. | 47/17 |
| 4,574,594 | 3/1986 | Simmons et al. | 62/457 |

Primary Examiner—Richard T. Stouffer
Assistant Examiner—Bradley M. Lewis
Attorney, Agent, or Firm—Gifford, Groh, VanOphem, Sheridan, Sprinkle and Dolgorukov

[57] ABSTRACT

A portable table having a platform comprised of a lightweight material with an outer insulated surface and a removable insulating cover. The platform includes a handle, a recessed dry storage compartment and a recessed ice storage compartment separated from the dry storage compartment by a separating member. A threaded orifice is provided between one storage compartment and the side of the platform for storing and draining water from the table. The table further includes supporting members fixedly secured to the botton of the platform for setting the platform on a conventional table and also includes legs pivotably secured to the platform to support the platform above the ground or floor. The legs are provided with retractable locking rings which frictionally engage the supporting member to secure the leg into position. The table includes numerous accessories which may be readily mounted to the table including a "sneeze" guard. Additionally, the table may be utilized as a greenhouse by adding a specially adapted cover or as a warming table by including food trays and associated burners.

35 Claims, 3 Drawing Sheets

U.S. Patent   Apr. 26, 1988   Sheet 2 of 3   4,739,580
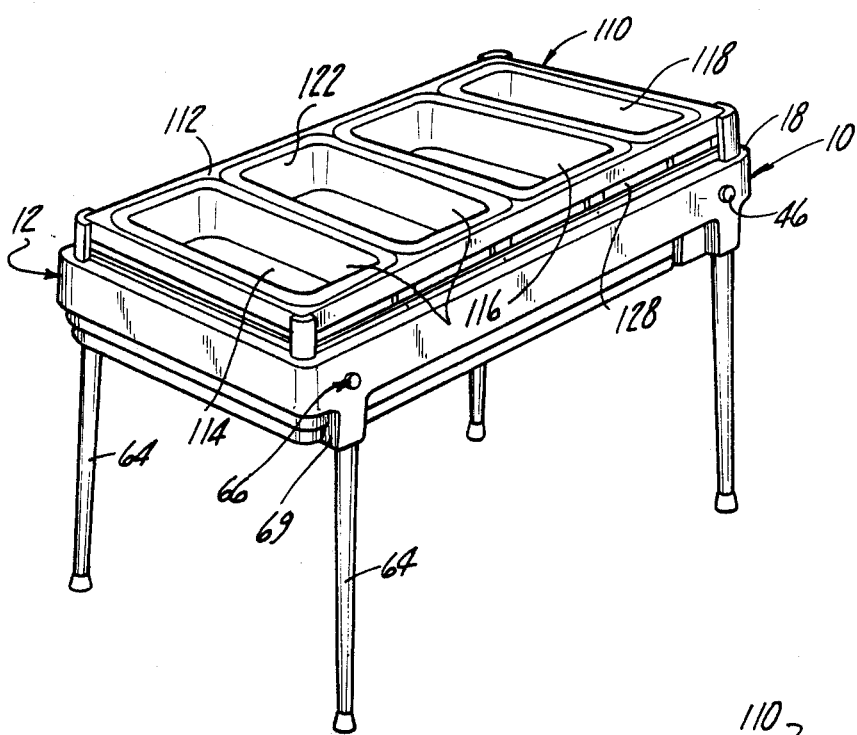
Fig-4
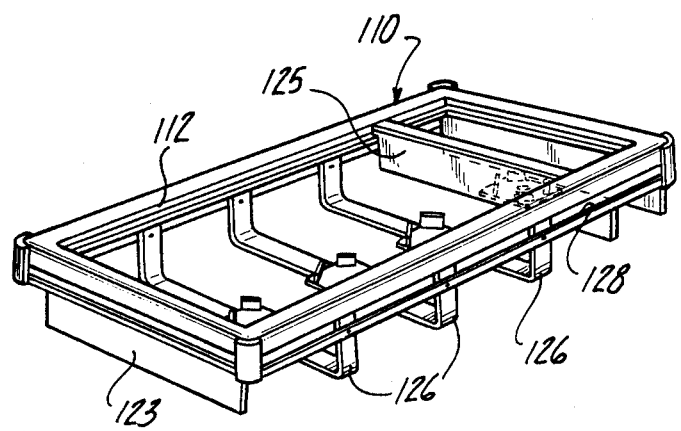
Fig-5
Fig-6
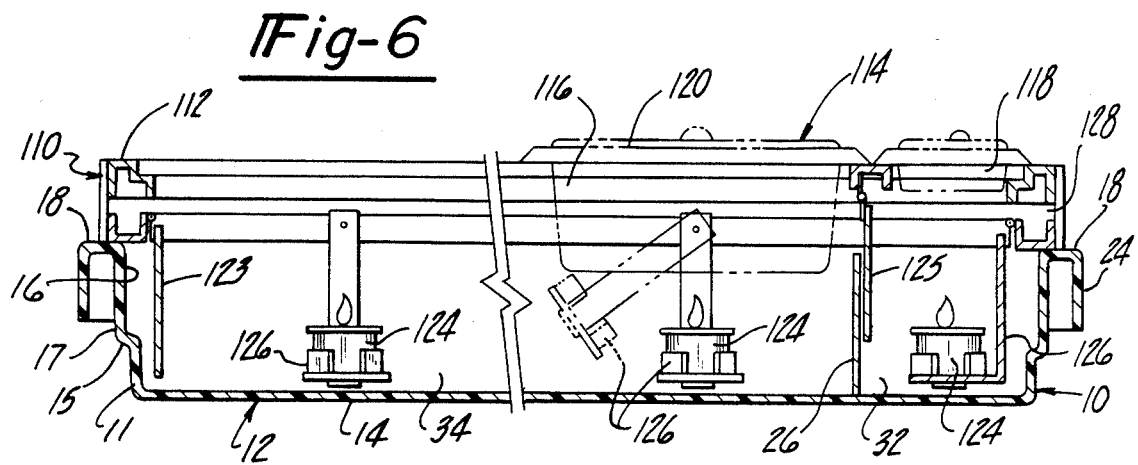

PORTABLE TABLE WITH FRICTIONALLY ENGAGABLE LEG LOCKING MECHANISM

This application is a division of application Ser. No. 718,158, filed Apr. 1, 1985 now U.S. Pat. No. 4,574,594.

BACKGROUND OF THE INVENTION

I. Field of the Invention

This invention relates to portable tables and, in particular, to a portable table for serving and preserving food which has a collapsible construction with leg locking members to facilitate storage and assembly of the device.

II. Description of the Prior Art

It is often desirable to serve food by setting it on tables and allowing an individual to select the particular items of food and the quantity desired. The serving of food in this manner has several advantages as it allows for several individuals to serve themselves at the same time. However, in order to keep food fresh and to prevent spoiling, the food may need to be stored on ice or a similar cooling material. Generally, the previously known ice tables are cumbersome because of the complex drainage and support structure and, thus, do not lend themselves to home use or transportation. These larger, previously known ice tables are utilized as permanent structures in restaurants and similar establishments which have sufficient space to store these tables.

Alternatively, hot foods may need to be kept warm in order to preserve their edible qualities. However, many of the previously known hot food tables do not lend themselves to efficient home use.

Our previous U.S. Pat. No. 4,375,758 issued on Mar. 8, 1983 discloses a portable ice table for serving food which is compact, light-weight and portable and which has space for storing ice to cool food and drinks served from the table. The table generally comprises a platform made of a light-weight rigid plastic material having an outer insulating surface. The platform contains two recessed compartments, a dry storage compartment and an ice storage compartment, separated by a fixed or removable divider. The ice storage compartment has a first section for storing ice, a removable ice supporting member, and a second section which facilitates drainage of water from the melting ice. The second section includes a threaded orifice with a valve which extends through the side of the platform for draining water from the ice table.

The previous ice table further includes legs which are pivotably secured to the platform and may be locked into place by a hinged brace which extends from the leg to the platform. The hinged braces are the type found on conventional tables and are usually constructed of metal. Because the hinged brace must be unlocked prior to collapsing the leg, the brace is usually exposed for easy access. In addition to detracting from the aesthetic appearance of the table, these exposed braces also increase the risk of accidental collapse of one or more legs. This is particularly true at events where children may be apt to explore the structure of the ice table. Moreover, because these hinged braces depend upon pressure exerted in a particular direction, use of the table on uneven surfaces or after improper set-up may cause eventual collapse of the table.

SUMMARY OF THE PRESENT INVENTION

The present invention overcomes the disadvantages of the previously known ice tables and our portable portable table disclosed in U.S. Pat. No. 4,375,758 by providing a portable multi-compartment table which utilizes locking rings mounted on each leg and which frictionally engage the platform to lock the legs in position.

The portable table according to the present invention generally comprises a platform constructed of a light-weight plastic material which contains two recessed compartments, which are separated by either a fixed or manually removable dividing member. The recessed storage compartment has an upper storing section, a removable perforated supporting member, and a lower section disposed beneath the supporting member and the upper section. The lower section includes a threaded orifice which extends through the side of the platform for draining water from the table. Water flows through openings in the perforated supporting member into the lower section. The bottom of the platform is sloped such that water flows towards the threaded orifice. A valve may be disposed within the orifice to control the flow of water through the orifice.

The present invention further includes legs which are pivotably secured to the platform and may be locked into place by the locking rings to support the platform above the floor or ground. If it is desired not to use the legs, the legs may be stored within the skirt of the platform and the platform may be placed on a table whereupon the platform rests on supporting members fixedly secured to the platform.

Food is placed in the upper section of the storage compartment where it is maintained while being served. A dry storage compartment is also provided for serving food which does not require chilling.

In accordance with the invention, the locking rings mounted to each of the legs frictionally engage the platform on the table to prevent the legs from pivoting into the closed position. The locking ring is provided with a series of ribs which facilitate handling of the ring. One side of the ring is square which frictionally engages the support member of the platform. The opposing side is provided with a pair of grooves which engage a vertical rib on the outer surface of the recessed compartments. The inter-action of these grooves with the rib prevents the leg from pivoting out of position. In addition, because the locking ring is disposed behind the support member it is hidden from view and out of reach of the curious hands of children. Moreover, the frictional pressure caused by the engagement of the ring between the rib and support member, prevents accidental disengagement of the locking mechanism.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 4 is an elevated perspective of an alternative embodiment of the present invention;

FIG. 5 is an elevated perspective of the warming platform which is placed on the table of the present invention;

FIG. 6 is a longitudinal perspective of the alternate embodiment with portions of the table removed for clarity;

DETAILED DESCRIPTION OF A PREFERRED EMBODIMENT OF THE PRESENT INVENTION

Figure 1:
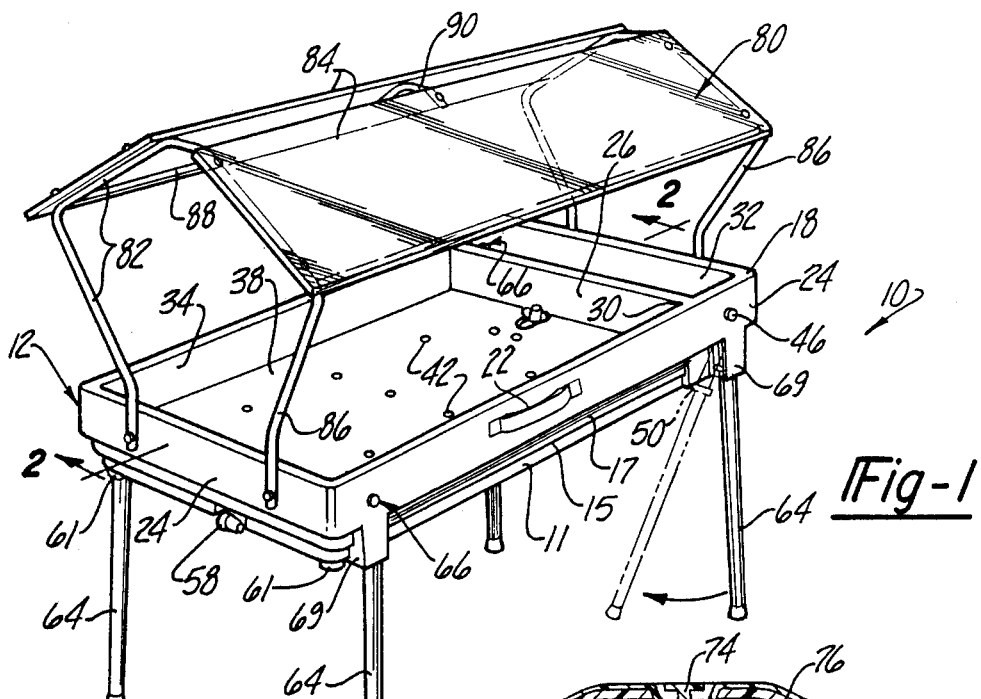
FIG. 1 is an elevated perspective of a preferred embodiment of the present invention.
Figure 2:
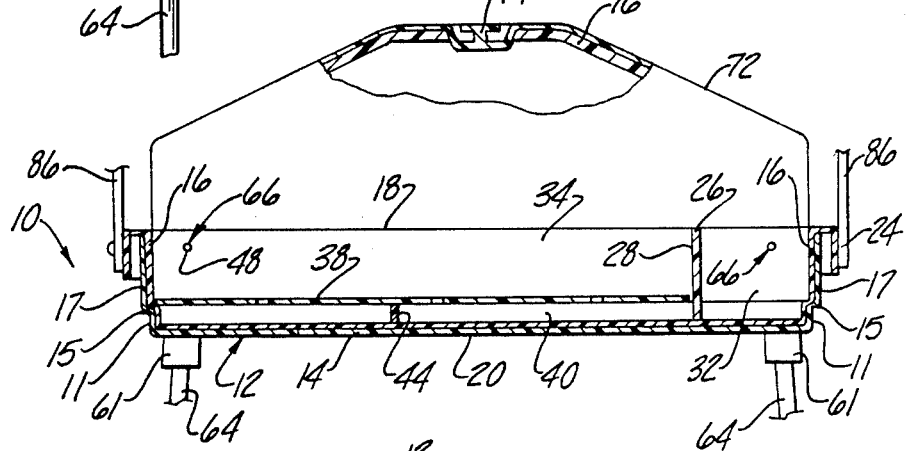
FIG. 2 is a longitudinal section of the present invention taken along line 2—2 of FIG. 1.

Referring generally to FIGS. 1 and 2 of the drawings, a portable table, collectively indicated by reference numeral 10, is comprised of a platform 12 comprised of a light-weight hard organic plastic material such as polyethylene or polypropylene, and having outer insulating surface 14 comprised of an expanded rigid polystyrene plastic such as Styrofoam.

Referring particularly to FIGS. 1 and 2, the platform 12 includes a bottom 20, a lower vertical wall 11 extending upward from the bottom 20, a ledge 15 extending outward from the lower vertical wall 11, an upper vertical wall 17 extending upward from the ledge 15 and having an upper edge 18, and a skirt 24 depending from the upper edge 18 and spaced from the wall 17.

The plateform 12 also includes an inner surface 16 extending from the bottom 20 to the upper edge 18 of the upper vertical wall 17.

The platform 12 has a handle 22 for carrying and transporting the table 10.

The platform 12 further includes a manually removable separating member 26 extending vertically from the bottom 20 of the platform 12 to the upper edge 18 of the inner surface 16. The separating member 26 is fitted into and held in place by grooves 28 and 30 within the inner surface 16. In an alternate embodiment, the separating member 26 is non-removable and fixedly secured to the inner surface 16.

The platform 12 also includes a recessed small storage compartment 32 and a recessed larger storage compartment 34 as shown in FIG. 2. The smaller storage compartment 32 is separated from the larger storage compartment 34 by the separating member 26. The storage compartment 34 has an upper section 36, a manually removable perforated ice supporting member 38 and a lower section 40. The upper section 36 is disposed above the lower section 40 with the perforated supporting member 38 being disposed between the upper section 38 and the lower section 40.

The perforated supporting member 38 includes openings 42 between the upper section 36 and lower section 40. In its preferred construcion it is comprised of a clear light-weight hard organic plastic material such as polyethylene or polypropylene which can be easily removed from cleaning. The supporting member 38 is positioned and supported between the upper section 36 and lower section 40 by resting it on the ledge 15 and center positioning member 44. The center positioning member 44 is fixedly secured to and extends from the bottom 20 of the platform 12.

The lower section 40 further includes a threaded orifice 58 which extends through the lower vertical wall 11 of the platform 12. A threaded valve stopper, hose or other similar device may be disposed within the threaded orifice 58 to control the opening and closing of the orifice 58.

The table 10 includes legs 64 to support the platform 12 above the floor or ground. The legs 64 are pivotably secured to the platform 12 by pins 66 having opposite ends 46 and 48. Ends 46 are secured to the upper vertical wall 17 with ends 48 secured to the skirt 24. The legs 64 include supporting positions where they are positioned in a direction which is generally vertical and normal to the platform 12.

Figure 3:
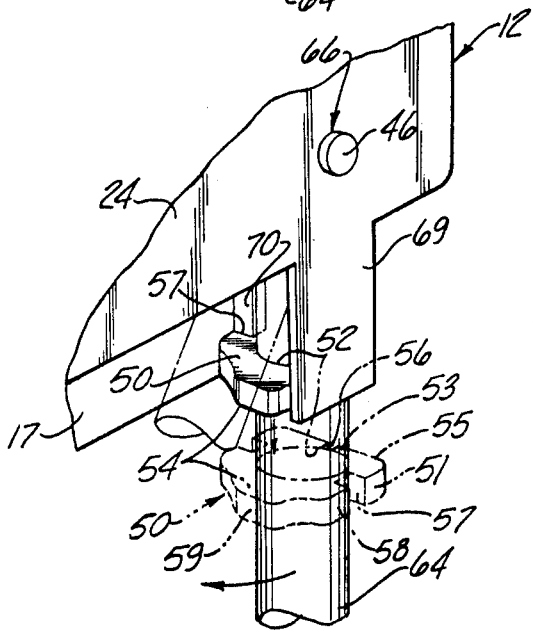
FIG. 3 is a detailed perspective of the leg locking assembly of the present invention.

The legs 64 are provided with locking rings 50 which encircle the legs 64 as shown in FIG. 3. The locking rings 50 provide vertical stability to the legs 64 and generally comprise a peripheral surface 51, which defines the outer configuration of the ring 50, and a throughbore 52 which is offset from the center of the ring 50 thereby defining a first thin wall 53, side walls 58 and a second thicker wall 54. The throughbore 52 defines the inner configuration of the ring 50 and may be any shape which conforms to the cross-sectional shape of the legs 64. In the embodiment shown in FIG. 3 the inner configuration of the ring 50 is round, although it may also be square or triangular.

As is shown in FIG. 3, the outer configuration of the locking ring 50 is substantially rectangular. Wall 53 has a planar outer surface 55 and a vertical slit 56 which allows expansion and contraction of the ring as will be hereinafter described. The walls 53 are provided with a pair of vertical grooves 57 which are formed parallel to the axis of the leg and throughbore 52. These grooves 57 secure the leg 64 in its proper position when the ring 50 is in the locking position as will be hereinafter described. Moreover, in the preferred embodiment, the thicker walls 54 of the ring 50 is provided with a flange portion 59 which facilitate gripping of the ring 50 during removal or placement.

When the legs 64 are in their non-supporting position they are stored within the platform 12 in the space 13 between the skirt 24 and the upper vertical 17 where they are held in place by clips (not shown) secured beneath the skirt 24 as shown in phantom line in FIG. 1. Alternatively, the legs 64 may be held in place within the platform 12 in the space 13 by the rings 50 frictionally engaging the skirt 24 and the vertical wall 17 or similar engaging members.

If the table 10 is to be used on a table top or like surface, the legs 64 are put in their non-supporting positions and the platform 12 is set on supporting members 61 which are fixedly secured to the platform 12 and which extend beneath the bottom 20 of the platform 12 as shown in FIG. 1 and 3.

As is best shown in FIG. 3, the vertical wall 17 is provided with a vertical rib 70 which engages the locking ring 50 in it upper locked position. Similarly, wall 69 is provided with a rib which also engages the locking ring. Since the inner configuration of the ring 50 conforms with the shape of the leg 64, the ring 50 may be easily moved up and down the leg 64 as desired. With the ring 50 in its lower position shown in phantom in FIG. 3, the leg 64 may be pivoted to its non-supporting or stored position. To secure the leg 64 in a supporting position, the leg 64 is extended perpendicular to the table 10 and the ring 50 is slid up the leg 64 such that it frictionally engages the supporting member 61 and vertical wall 17. In its engaged position, the planar outer surface 55 of the ring 50 frictionally engages the inner surface of the support member 61 while wall 54 frictionally engages vertical wall 17. In addition, one of the grooves 57 engages the vertical rib 70 on wall 17 and wall 69 which prevents the ring 50 from disengaging and the legs 64 from inadvertently collapsing. Moreover, with the ring 50 in the engaging position, the pressure exerted by the support member 61, the vertical wall 17, and the rib 70, causes the ring 50 to contract thereby increasing the frictional engagement between the ring 50 and the leg 64. Alternatively, the upper portion of the leg 64 may be enlarged to increase the frictional contact between the ring 50 and the leg 64 thereby further preventing inadvertent disengagement.

The table 10 is used by placing the food to be kept chilled in the larger storage compartment 34 and food which is not required to be chilled in the smaller storage compartment 32. While the food is being served, the ice in the upper section 36 of the larger storage compartment 34 begins to melt and water flows through the openings 42 of the perforated supporting member 38 into the lower section 40.

The lower section 40 can be drained continuously by leaving the orifice 58 open for the entire use of the table 10. Alternatively, water can be stored in the lower section 40 by leaving the orifice 58 closed during the use of the table 10 and then draining the water from the lower section 40 by opening the orifice 58 when the use of the table 10 is no longer required.

The rigid polystyrene plastic provided in the outer surface 14 of the platform 12 maintains a cool temperature within the table 10 thereby showing the melting process and preventing condensation.

In addition to being utilized as an ice table for maintaining chilled food, the table 10 of the present invention may alternatively be utilized as a warming table by adding a warming platform 110. The warming platform 110 comprises a support frame 112 which supports the individual warming trays 114. In a preferred embodiment shown in FIGS. 4 through 6, the table includes three larger warming trays 116 and one smaller tray 118 although any size and number of trays 114 may be employed. As shown in FIG. 6, the one smaller tray 118 is disposed within the smaller compartment 32 of the table 10 while the larger trays 116 are mounted in the larger compartment 34. Each of the warming trays 116 and 118 consists of a food tray 120 which is disposed within a deeper steam tray 122. Prior to serving, the steam tray 122 is partially filled with water in order to provide constant heat to the food tray 120. Disposed below each of the trays 114 is a burner 124, such as a sterno burner, which applies heat to the steam tray 122 which in turn heats the food tray 120. In order to protect the inner surface 16 of the compartment 34 and the separating member 26, pivotable protectors 123 and 125 are provided such that they extend downwardly in close proximity to the inner surfaces 16 of the table 10. As with the platform 110, these protectors are preferrably made of metal in order to reflect the heat produced by the burners 124 thereby protecting the inner surface 16 of the table 10.

The warming platform 110 may be mounted to the table 10 in either a raised or lowered position depending upon the amount of heat needed. In the raised position, as shown in FIGS. 4 and 6, the platform 110 and the trays 114 are maintained above the ledge 18 of the table 10. In order to maintain the burner 124 in close proximity to the trays 114, a support 126 is provided. Generally, the platform 110 is maintained in its raised position when the food must be kept very hot since the ventilation slit 128 provides sufficient ventilation to the burners 124.

When it is desired to store the warming trays 114 in their lowered position within the compartments 32 and 34, the platform 110 is simply reversed so that it extends downwardly in the compartment. In this position, the individual burners 124 are maintained on the bottom of the table 10. However, because less ventilation is available, the burners 124 provided less heat thereby maintaining the food rays of a lower temperature.

The table 10 may also include a removable cover 72 comprised of a hard organic plastic such as polyethylene or polypropylene and includes a handle 74 as shown in FIG. 2. The cover 72 has an inner insulating surface 76 which is comprised of an expanded rigid plastic such as Styrofoam. Alternatively, the cover 72 may be comprised of a reflective fabric which is held on the table 10 by tension in an outer elastic band such as can be found on conventional table covers. The reflective fabric reflects heat from the sun thereby slowing the melting of the ice stored in one compartment 34.

An additional accessory of the table 10 as shown in FIG. 1 and is generally known as a "sneeze" guard or hood guard 80. The hood guard 80 is demountably secured to the ends of the platform 12 and generally comprises a support structure 82 and at least one planar guard 84. The support structure 82 is preferably constructed of metal tubing and can be attached to the platform 12 to support the planar guard 84. The support structure comprises a pair of end frame members 86 and a plurality of lateral supports 88. The planar guards 84, which are preferably made of a transparent rigid plastic, are fixedly secured to the frame members 86 and lateral supports 88. Additional supports 90 may be included on hood guards 80 of greater length.

Figure 7:
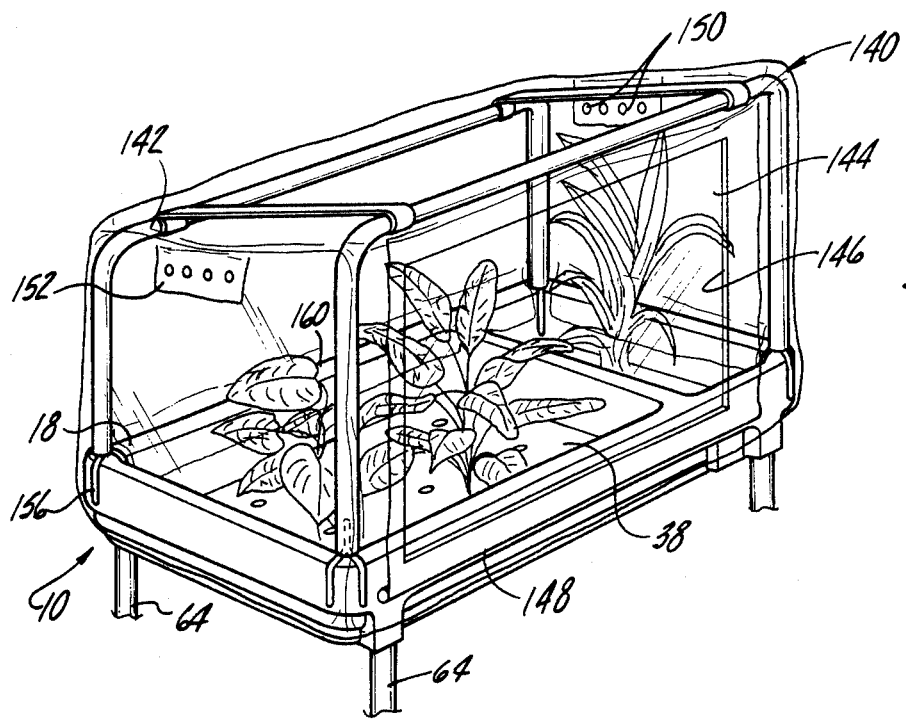
FIG. 7 is an elevated perspective of a still further embodiment of the present invention.
Figure 8:
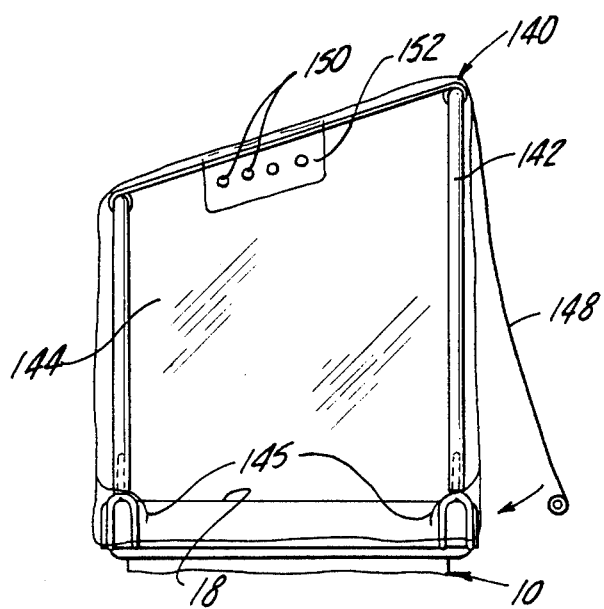
FIG. 8 is an end perspective of the embodiment of the invention shown in FIG. 7.

A still further feature of the present invention is the convertability of the table 10 to a greenhouse as shown in FIGS. 7 and 8. A greenhouse canopy 140 is mounted to the ledge 18 of table 10. The canopy 140 includes a frame 142 and a housing 144 supported by the frame 142. In the preferred embodiment, the frame 142 is mounted to the corners of the table 10. The housing 144, which is preferrably made of a transparent plastic material, is simply slipped over the top of the frame 142 until it encloses the top of the table 10. The housing 144 includes a front opening 146 and a flap 148 which covers the opening 146. The flap 148 normally depends downwardly in front of the opening 146 but may be folded upwardly so that it lies on top of the canopy 140. In addition, a temperature sensor and an artificial light (not shown) may be included to maintain optimum growing conditions. The housing 144 may also include ventilation openings 150 disposed in the sides of the housing 144 as shown in FIGS. 7 and 8. These openings 150 may be opened and closed in order to control the internal environment by flipping back the cover flaps 152. The housing 144 also includes an inwardly extending flap portion 145 which causes any water sprayed or splashed on the housing 144 to run into the table 10 and not along the outside onto the floor.

Figure 9:
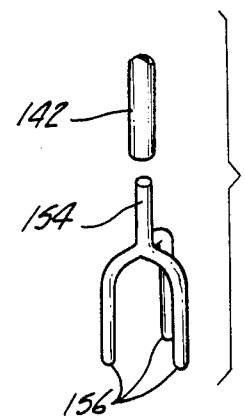
FIG. 9 is a detailed perspective of the leg mounting of this embodiment shown in FIG. 7.

The greenhouse canopy 140 is readily mounted to the table 10 utilizing the frame legs 154 shown in FIG. 9. These legs 154 generally include downwardly depending fingers 156 which fit over the corners of the table 10. Once the legs 154 are in the position the frame 142 can be assembled thereon by sliding the end of the frame 142 onto the upwardly depending member 158 of the leg 154 as shown in FIG. 9.

The table 10 is well suited for use as a greenhouse because of the perforated supporting member 38 which provides for continuous drainage when the plants or flowers are watered. In the preferred embodiment, the plants 160 are placed on the supporting member 38 which allows drainage into the lower section 40 and through the orifice 58. In addition, the smaller compartment 32 may be utilized to store maintenance materials such as gloves, tools or fertilizer. Thus, it can be appreciated that the greenhouse canopy 140 mounted to the table 10 provides a controlled environment for growing plants which has highly aesthetic qualities yet is compact enough to be used in the home.

While the embodiment herein described calls for the table 10 to be comprised of a hard organic plastic material, it would be apparent to one skilled in the art that the table 10 may be constructed of a suitable alternate material such as wood or a light-weight metal.

Furthermore, it is to be understood that use of the locking ring 50 of the present invention is not limited to the cooling table 10 but may be incorporated into other collapsible tables. Although the locking ring is herein described as frictionally engaging the rib 70 and vertical wall 17, it should be understood that the locking ring 50 may be utilized on conventional tables by including a wall which extends downwardly from the outer edge of the table and has a vertical rib to frictionally engage only one side of the locking ring 50 and the grooves 57.

The foregoing detailed description has been given for clearness of understanding only and no unnecessary limitations should be understood therefrom as some modifications will be obvious to those skilled in the art to which it pertains without departing from the scope and spirit of the present invention as defined in the appended claims.

We claim:
1. A portable table comprising:
a platform having an outer surface, a bottom, a vertical wall extending upward from said bottom and having an inner surface, and a dividing member with opposite ends secured to the inner surface and extending vertically from said bottom of said platform;
wherein said platform further includes a recessed first storage compartment and a recessed second storage compartment separated from said first storage compartment by said dividing member and having an upper section, a manually removable perforated supporting member and a lower section;
wherein said upper section is disposed above said lower section with said supporting member disposed therebetween;
wherein said supporting member includes a plurality of openings between said upper and lower sections;
wherein said lower section includes at least one positioning member to support said supporting member between said upper and lower section;
wherein said lower section includes means to store and drain water from said second storage compartment;
a plurality of supporting members fixedly secured to said platform and extending downwardly therefrom; and
a plurality of support legs pivotally secured to said platform wherein said support legs include a locking ring to lockingly engage said legs in a supporting or a non-supporting position, said locking ring comprising:
a substantially rectangular peripheral configuration with a planar front surface, a pair of side surfaces, and a rear surface having at least one groove disposed parallel to the axis of said locking ring; and
a throughbore offset from the center of said locking ring wherein said throughbore conforms to the cross-sectional shape of said support leg.

2. The table as defined in claim 1 and further comprising a warming platform, said platform including a support frame having a plurality of openings, and a plurality of trays disposed within said platform.

3. The table as defined in claim 2 wherein said trays are removably supported within said openings of said frame.

4. The table as defined in claim 3 wherein each said tray includes a steamer tray and a food tray wherein said food tray is disposed in said steamer tray.

5. The table as defined in claim 4 wherein said table include means for heating each of said trays.

6. The table as defined in claim 1 and further comprising a greenhouse canopy.

7. The table as defined in claim 6 wherein said canopy comprises a frame dismountably attached to said platform and a housing mounted to said frame.

8. The table as defined in claim 7 wherein said housing is made of a transparent plastic material.

9. The table as defined in claim 7 wherein said housing includes a frontal opening and a flap member removably disposed across said opening wherein said flap closes said opening.

10. The table as defined in claim 7 wherein said canopy further includes means for illuminating said table.

11. The table as defined in claim 7 wherein said canopy further includes means for indicating the interior temperature of said housing.

12. The table as defined in claim 7 wherein said housing includes an inwardly extending flap portion.

13. The table as defined in claim 1 wherein said platform is comprised of a light-weight hard organic plastic material.

14. The table as defined in claim 1 wherein said outer insulating surface of said platform is comprised of an expanded rigid polystyrene plastic.

15. The table as defined in claim 1 wherein said means to store and drain water from said first storage compartment comprises an orifice in said second section extending through said platform and includes means for opening and closing said orifice.

16. The table as defined in claim 15 wherein said orifice is threaded.

17. The table as defined in claim 15 wherein said means for opening and closing said orifice comprises a valve having open and closed positions disposed within said orifice.

18. The table as defined in claim 15 wherein said bottom of said platform is sloped such that water flows away from said second storage compartment towards said orifice.

19. The table as defined in claim 18 wherein the water is stored in said lower section when said orifice is closed.

20. The table as defined in claim 18 wherein the water is drained from said lower section when said orifice is open.

21. The table as defined in claim 1 and further comprising a removable insulating cover.

22. The table as defined in claim 21 wherein said cover is comprised of a light-weight hard organic plastic material having a handle and including an inner insulating surface.

23. The table as defined in claim 22 wherein said inner insulating surface of said cover is comprised of an expanded rigid polystyrene plastic.

24. The table as defined in claim 21 wherein said cover is comprised of a light reflecting fabric with an elastic band secured to its edge.

25. The table as defined in claim 1 wherein said platform includes a skirt around its perimeter depending from the upper edge of said inner surface and spaced from said vertical wall.

26. The table as defined in claim 25 wherein said legs are stored within said platform in the space between said skirt and said vertical wall when in said non-supporting positions.

27. The table as defined in claim 26 wherein said fixedly secured supporting members support said platform above the generally horizontal surface when said support legs are in a non-supporting position.

28. The table as defined in claim 25 wherein said legs are positioned in a direction which is generally vertical and normal to said platform when in said supporting positions.

29. The table as defined in claim 25 wherein said fixedly secured supporting members extend downwardly from said skirt.

30. The table as defined in claim 1 wherein said separating member is manually removable with opposite ends securable to said inner surface of said platform.

31. The table as defined in claim 1 and further comprising a hood guard demountably secured to said platform of said table whereby said hood guard shields the top of said platform from debris while allowing access to said storage compartments.

32. The table as defined in claim 31 wherein said hood guard comprises a support structure and at least one rigid planar member fixedly secured to said support structure, said support structure demountably secured to said platform.

33. The table as defined in claim 32 wherein said rigid planar member is a transparent planar material.

34. The table as defined in claim 1 wherein said front planar surface of said locking ring frictionally engages said fixedly secured supporting member and wherein said rear surface of said locking ring frictionally engages said vertical wall of said platform.

35. The table as defined in claim 34 wherein said vertical wall of said platform includes a vertical rib and wherein said at least one groove of said rear surface engages said vertical rib whereby said support leg is prevented from pivoting from its supporting position.

* * * * *

UNITED STATES PATENT AND TRADEMARK OFFICE
CERTIFICATE OF CORRECTION

PATENT NO. : 4,739,580
DATED : 4/26/88
INVENTOR(S) : Jesse K. Simmons and Maralyne J. Simmons It is certified that error appears in the above-identified patent and that said Letters Patent is hereby corrected as shown below:

Col. 1, line 22, delete "fresn" and insert --fresh-- ;

Col. 2, line 4, delete "portable".

Col. 2, line 43, delete "square" and insert --squared--.

Col. 3, line 55, delete "ice".

Col. 4, line 36 after "leg", insert --64--;
line 45 after "vertical", insert --wall--.

Col. 5, line 35, delete "showing" and insert --slowing--;

line 61 after "protectors", insert --123 and 125--.

Col. 6, line 1, delete "ledge" and insert --upper edge--;

line 15, delete "rays" and insert --trays--;

line 44, delete "ledge" and insert --upper edge--.

Col. 8, line 40, delete "as" 2nd occurrence and insert --in--.

Signed and Sealed this

Fifteenth Day of November, 1988

Attest:

DONALD J. QUIGG

Attesting Officer

Commissioner of Patents and Trademarks